(12) United States Patent
Ilkbahar et al.

(10) Patent No.: US 6,172,937 B1
(45) Date of Patent: Jan. 9, 2001

(54) MULTIPLE SYNTHESIZER BASED TIMING SIGNAL GENERATION SCHEME

(75) Inventors: Alper Ilkbahar, Santa Cruz; Simon M. Tam, Redwood City, both of CA (US); Ian A. Young, Portland, OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/309,049

(22) Filed: May 10, 1999

Related U.S. Application Data
(60) Provisional application No. 60/085,321, filed on May 13, 1998.

(51) Int. Cl.[7] ................................................ G11C 8/00
(52) U.S. Cl. ............................................ 365/233; 365/193
(58) Field of Search .......................... 365/233, 230.04, 365/193, 191

(56) References Cited

U.S. PATENT DOCUMENTS

| | | |
|---|---|---|
| 4,419,150 | 12/1983 | Soclof . |
| 4,419,633 | 12/1983 | Phillips . |
| 4,712,223 | 12/1987 | Nelson . |
| 4,724,402 | 2/1988 | Ireland . |
| 4,782,499 | 11/1988 | Clendening . |
| 4,801,896 | 1/1989 | Phillips et al. . |
| 4,817,199 | 3/1989 | Wallraff . |
| 4,853,653 | 8/1989 | Maher . |
| 4,857,868 | 8/1989 | Robb . |
| 5,281,785 | 1/1994 | Glass et al. . |
| 5,337,024 | 8/1994 | Collins . |
| 5,337,285 | 8/1994 | Ware et al. . |
| 5,355,090 | 10/1994 | Pajowski et al. . |
| 5,448,597 | 9/1995 | Hashimoto . |
| 5,463,337 | 10/1995 | Leonowich . |
| 5,471,587 | 11/1995 | Fernando . |
| 5,555,213 | 9/1996 | Delong . |
| 5,581,782 * | 12/1996 | Sarangdhar et al. ................ 395/800 |
| 5,600,824 | 2/1997 | Williams et al. . |
| 5,802,132 | 9/1998 | Pathikonda et al. . |
| 5,923,857 * | 7/1999 | Pawlowski et al. ................ 395/287 |
| 5,949,262 * | 9/1999 | Dreps et al. ........................ 327/156 |

\* cited by examiner

Primary Examiner—David Nelms
Assistant Examiner—Thong Le
(74) Attorney, Agent, or Firm—Blakely, Sokoloff, Taylor & Zafman LLP

(57) ABSTRACT

A multiple synthesizer based timing signal generation scheme is described that allows accurate data and strobe generation in high speed source synchronous system interfaces. Multiple loop locked clock synthesizers (e.g., phase locked loops, delay locked loops) are used to generate multiple clock signals. Data and strobe signals are triggered off of transitions of one of the clock signals. Because multiple loop locked clock synthesizers are used to generate the clock signals, optimal or near optimal alignment of the data and strobe signals can be achieved. Improved alignment of the data and strobe signals provides improved data transmission rates.

25 Claims, 6 Drawing Sheets

MULTIPLE SYNTHESIZER BASED TIMING SIGNAL GENERATION SCHEME

This U.S. patent application claims the benefit of U.S. Provisional Application Ser. No. 60/085,321, filed May 13, 1998.

FIELD OF THE INVENTION

The invention relates to electronic systems. More particularly, the invention relates to a multiple synthesizer based scheme for generating timing signals in an electronic system.

BACKGROUND OF THE INVENTION

Source synchronous data transfer schemes have been used to increase data transfer rate as compared to common clocked data transfer schemes. While common clocked data transfer schemes use a common clock signal for devices on the sending and receiving ends of a data transfer, in source synchronous data transfer schemes, the sending device provides one or more strobe signals with the data being transferred. The receiving device uses the strobe signal to sample the incoming data.

In order to maximize data transfer, the sampling point as determined by the strobe signal should be in the center of the data time period. This provides a setup margin of one-half data period and a hold margin of one-half data period. The strobe signal can be centered by the sending device or by the receiving device. What is needed is method and apparatus to center strobe signals with respect to the data signals with which the strobe signals are transferred.

SUMMARY OF THE INVENTION

Multiple synthesizer based timing signal generation scheme is described. In one embodiment a core clock signal is generated based, at least in part, on a system clock signal. A bus clock signal is generated based, at least in part, on the core clock signal. A strobe signal is generated based, at least in part on the secondary clock signal. The strobe signal corresponds to alternative transitions of the secondary clock signal and data is output on alternating secondary clock transitions on which the strobe signal does not change state.

In one embodiment, a core clock signal is generated based, at least in part, on a system clock signal. A secondary clock signal is also generated based, at least in part, on the system clock signal. A strobe signal is generated based, at least in part on the secondary clock signal. The strobe signal corresponds to alternative transitions of the secondary clock signal and data is output on alternating secondary clock transitions on which the strobe signal does not change state.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

Multiple synthesizer based timing signal generation scheme is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides a clock generation scheme that allows accurate data and strobe generation in high speed source synchronous system interfaces. Multiple loop locked clock synthesizers (e.g., phase locked loops, delay locked loops) are used to generate multiple clock signals. Data and strobe signals are triggered off of transitions of one of the clock signals. Because multiple loop locked clock synthesizers are used to generate the clock signals, optimal or near optimal alignment of the data and strobe signals can be achieved. Improved alignment of the data and strobe signals provides improved data transmission rates.

Figure 1:
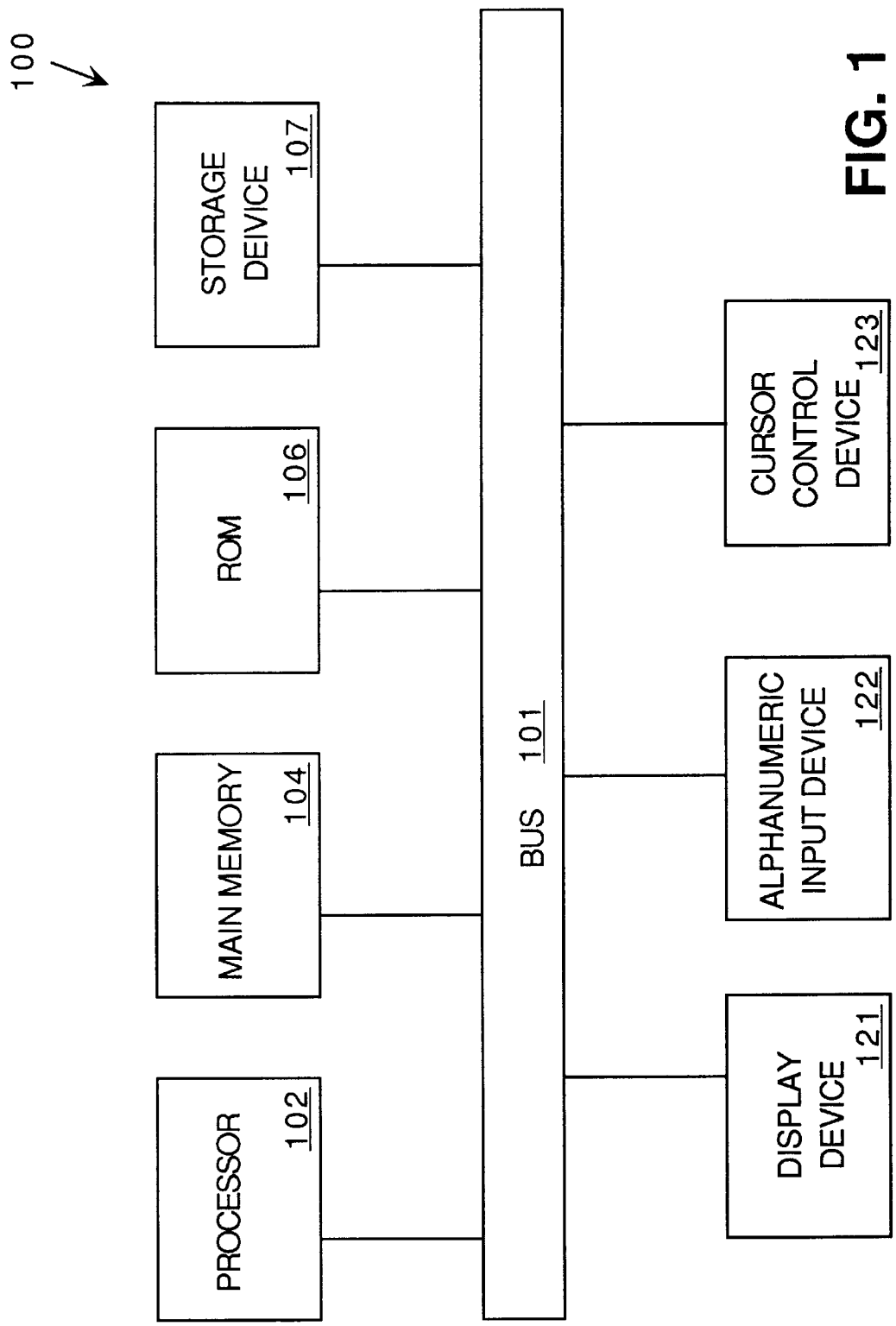
FIG. 1 is a block diagram of a computer system suitable for use with the invention.

FIG. 1 is a block diagram of a computer system suitable for use with the invention. Computer system 100 comprises bus 101 or other device for communicating information, and processor 102 coupled with bus 101 for processing information. In one embodiment processor 102 is a processor from the Intel family of processors available from Intel Corporation of Santa Clara, Calif.; however, other processors may also be used.

Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also comprises read only memory (ROM) and/or other static storage device 106 coupled to bus 101 for storing static information and instructions for processor 102. Data storage device 107 is coupled to bus 101 for storing information and instructions.

Data storage device 107 such as magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user.

Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

In one embodiment, processor 102 and one or more of the components coupled to bus 102, such as main memory 104, are source synchronous components. Of course, any one or more components of computer system 100 can be source synchronous. Thus, computer system 100 can be either a partially source synchronous or fully source synchronous environment. In one embodiment, computer system 100 is a differential-strobe source synchronous system in which complementary strobe signals are communicated in parallel with data signals over the bus. Alternatively, computer system 100 is a single-strobe source synchronous system in which a single strobe signal is communicated in parallel with data signals over the bus.

Figure 2:
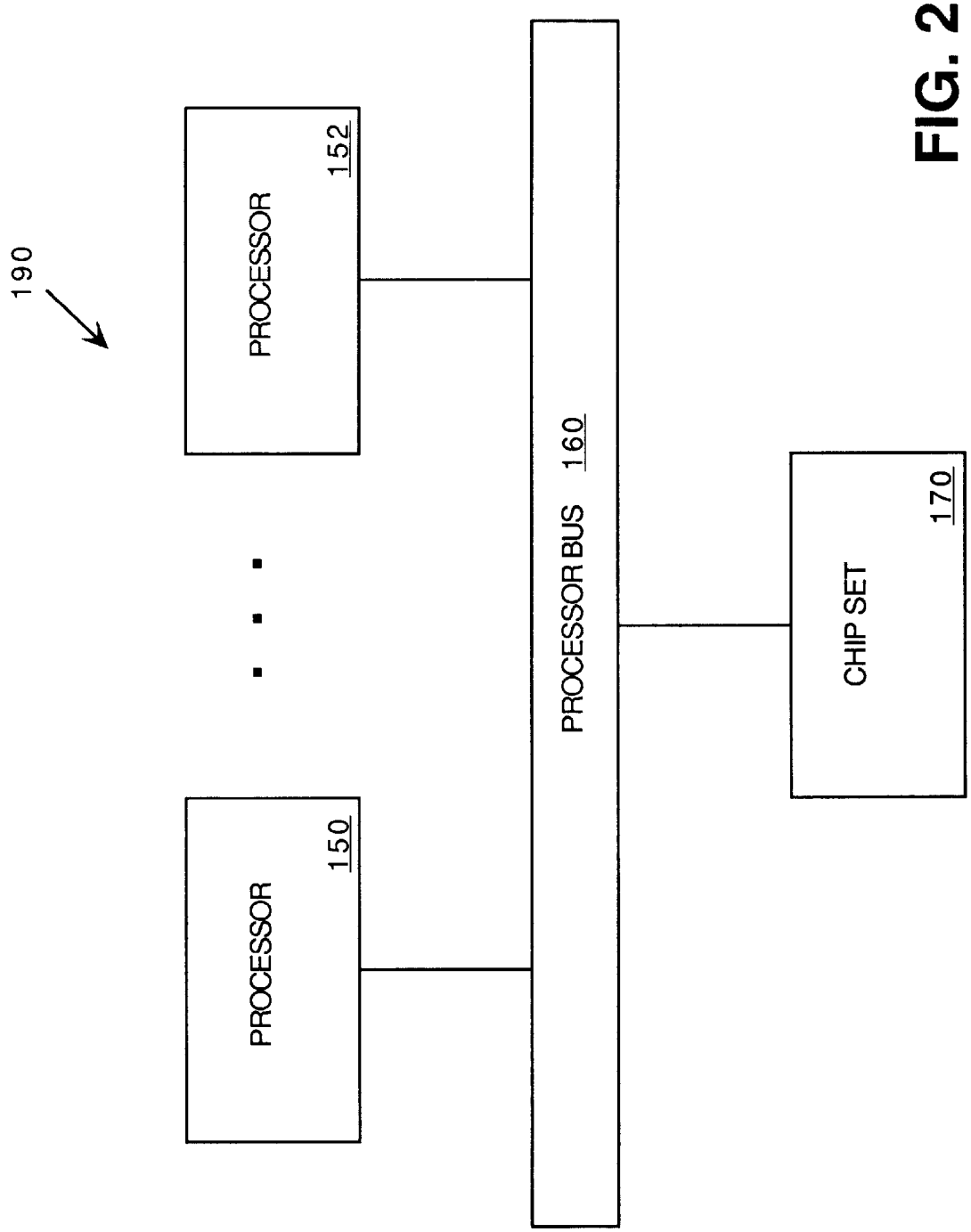
FIG. 2 is a block diagram of a multi-processor computer system suitable for use with the invention.

FIG. 2 is a block diagram of a multi-processor computer system suitable for use with the invention. Computer system 190 generally includes multiple processors (e.g., processor 150 through processor 152) coupled to processor bus 160. Chip set 170 provides an interface between processor bus 160 and other components of computer system 190, such as a system bus (not shown in FIG. 2). Other system components, such as those described with respect to computer system 100 can be coupled to the system bus.

Computer system 190 is a higher performance system than computer system 100 in both bus architecture and number of processors. In one embodiment, processor bus 160 communicates information in a source synchronous manner. Processors 150 and 152 can be any type of processor. In one embodiment, processors 150 and 152 are from the Intel Corporation family of processors. Chip set 170 provides an interface between processor bus 160 and the remaining components of computer system 190 in any manner known in the art.

Figure 3:
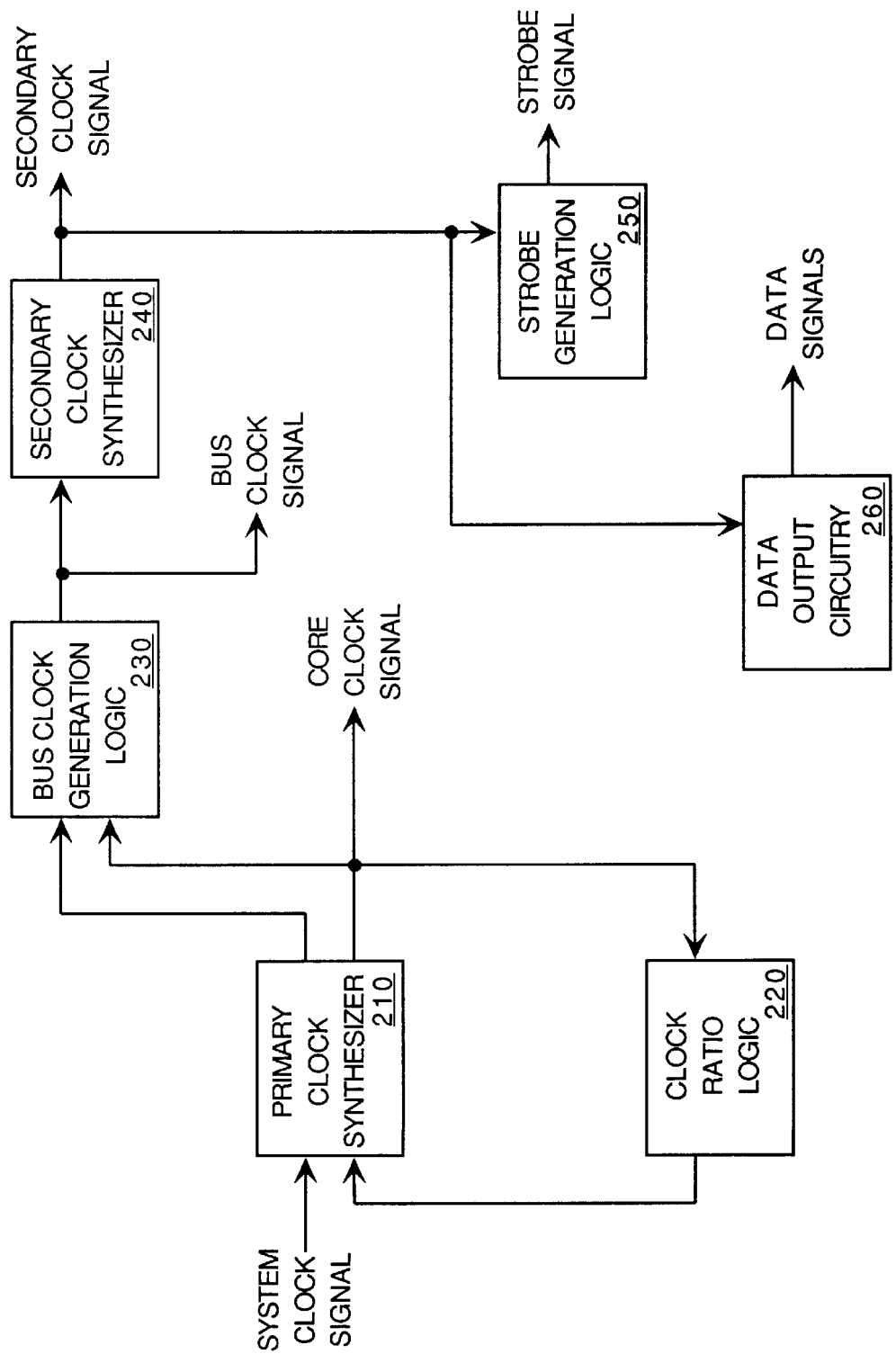
FIG. 3 is a block diagram of a multiple sequential synthesizer based clock generation scheme according to one embodiment of the invention.

FIG. 3 is a block diagram of a multiple sequential synthesizer based clock generation scheme according to one embodiment of the invention. Primary clock synthesizer 210 receives a system clock signal or other clock signal from a clock generation or other circuit (not shown in FIG. 3). Primary clock synthesizer 210 generates a core clock signal based on the system clock signal. In one embodiment, primary clock synthesizer 210 multiplies the system clock signal to generate the core clock signal. Primary clock synthesizer 210 can also divide the system clock signal to generate a core clock signal with a reduced frequency, if desired.

In one embodiment primary clock synthesizer 210 is a phase locked loop (PLL) device. Alternatively, primary clock synthesizer 210 can be a delay locked loop (DLL) device. In one embodiment, primary clock synthesizer 210 generates a core clock signal having a frequency that is four times the system clock frequency; however, other frequency relationships can also be used. In one embodiment, both the system clock signal and the core clock signal have a 50% duty cycle; however, other duty cycles can be supported.

Bus clock generation logic 230 receives the core clock signal and generates a bus clock signal. In one embodiment, the bus clock signal frequency is equal to the system clock frequency. The bus clock signal can be used, for example, for synchronization of components on the bus, such as common clocked data transfers. In one embodiment, combinatorial logic is used to generate the bus clock signal. The bus clock signal is not required to have a 50% duty cycle when the core clock signal has a 50% duty cycle.

In one embodiment, bus clock generation logic 130 also receives a bus clock enable signal from primary clock synthesizer 210. The bus clock enable signal is used to align the core clock signal and the bus clock signal generated by bus clock generation logic 230.

Clock ratio logic 220 controls the ratio of the core clock signal frequency to the system clock signal frequency. In one embodiment, the core clock signal frequency is four times the system clock signal frequency; however, other ratios can also be supported. The ratio of the core clock signal frequency to the system clock signal frequency can also be fractional (e.g., 2.5:1). Clock ratio logic 220 provides feedback so that the core clock signal frequency is maintained at a constant relationship to the system clock signal frequency.

Secondary clock synthesizer 240 receives the bus clock signal and generates a secondary clock signal. In one embodiment, the secondary clock signal frequency is twice the bus clock signal frequency; however, other frequency relationships can be supported. In one embodiment, secondary clock synthesizer 240 is a PLL. Alternatively, secondary clock synthesizer 240 is a DLL.

In one embodiment the secondary clock signal has a 50% duty cycle. As described in greater detail below, the 50% duty cycle allows maximum setup and hold times for a particular bus clock frequency. Secondary clock synthesizer 240 thus generates a 50% duty cycle signal from a signal that does not have a 50% duty cycle.

The secondary clock signal is input to strobe generation logic 250. Strobe generation logic 250 generates a strobe signal to be used for source synchronous communications. In one embodiment, strobe signal transitions occur on alternating transitions of the secondary clock signal. Strobe generation logic 250 can generate differential strobe signals to support differential strobe source synchronous communications.

In one embodiment, data output circuitry 260 also receives the secondary clock signal. Data is output on alternating transitions of the secondary clock signal that are not the transitions on which the strobe signal makes transitions. Thus, the strobe signal transitions are centered with respect to the data signals output by data output circuitry 260.

A physical implementation of the block diagram of FIG. 3 can include multiple buffers for matching delay between elements, increasing signal strength, etc. The buffers can be used in any manner know in the art.

Figure 4:
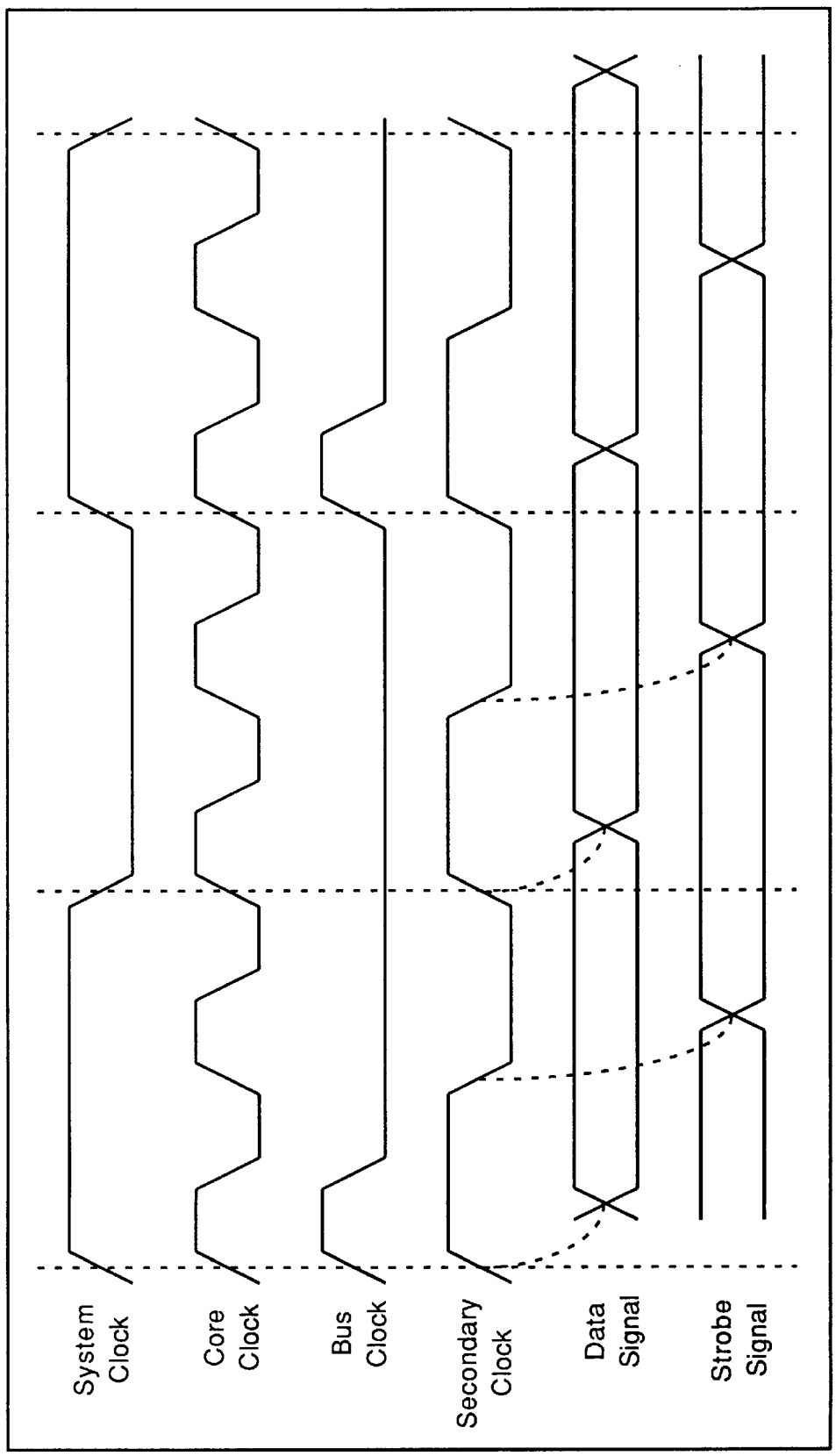
FIG. 4 is a waveform diagram of clock signals generated by the circuitry of FIG. 3.

FIG. 4 is a waveform diagram of clock signals generated by the circuitry of FIG. 3. The waveform diagram of FIG. 4 is for an embodiment having a 4:1 relationship between the core clock frequency and the system clock frequency. Other ratios can also be supported, for example, 2:1, 2.5:1, 5:1.

The system clock signal has a base frequency that is use to drive the clock generation scheme. Core clock has a frequency that is greater than the frequency of the system clock signal. The core clock signal is generated by a primary clock synthesizer. In one embodiment, the bus clock signal has a frequency that is equal to the frequency of the system clock with a different duty cycle. The bus clock signal is generated by the bus clock generation logic. The bus clock signal frequency is not required to be equal to the system clock frequency and any duty cycle can be used for the bus clock signal.

The secondary clock signal has a frequency that is higher than the frequency of the bus clock signal. The secondary clock signal is generated by the secondary clock synthesizer. In one embodiment data signals are output in response to rising edges of the secondary clock signal and the strobe signal changes state in response to falling edges of the secondary clock signal. Alternatively, data signals can be output in response to the falling edges of the secondary clock signal and the strobe signal changes state in response to the rising edges of the secondary clock signal. The data signal and the strobe signal of FIG. 4 are offset from the edges of the secondary clock signal to show propagation delay.

Figure 5:
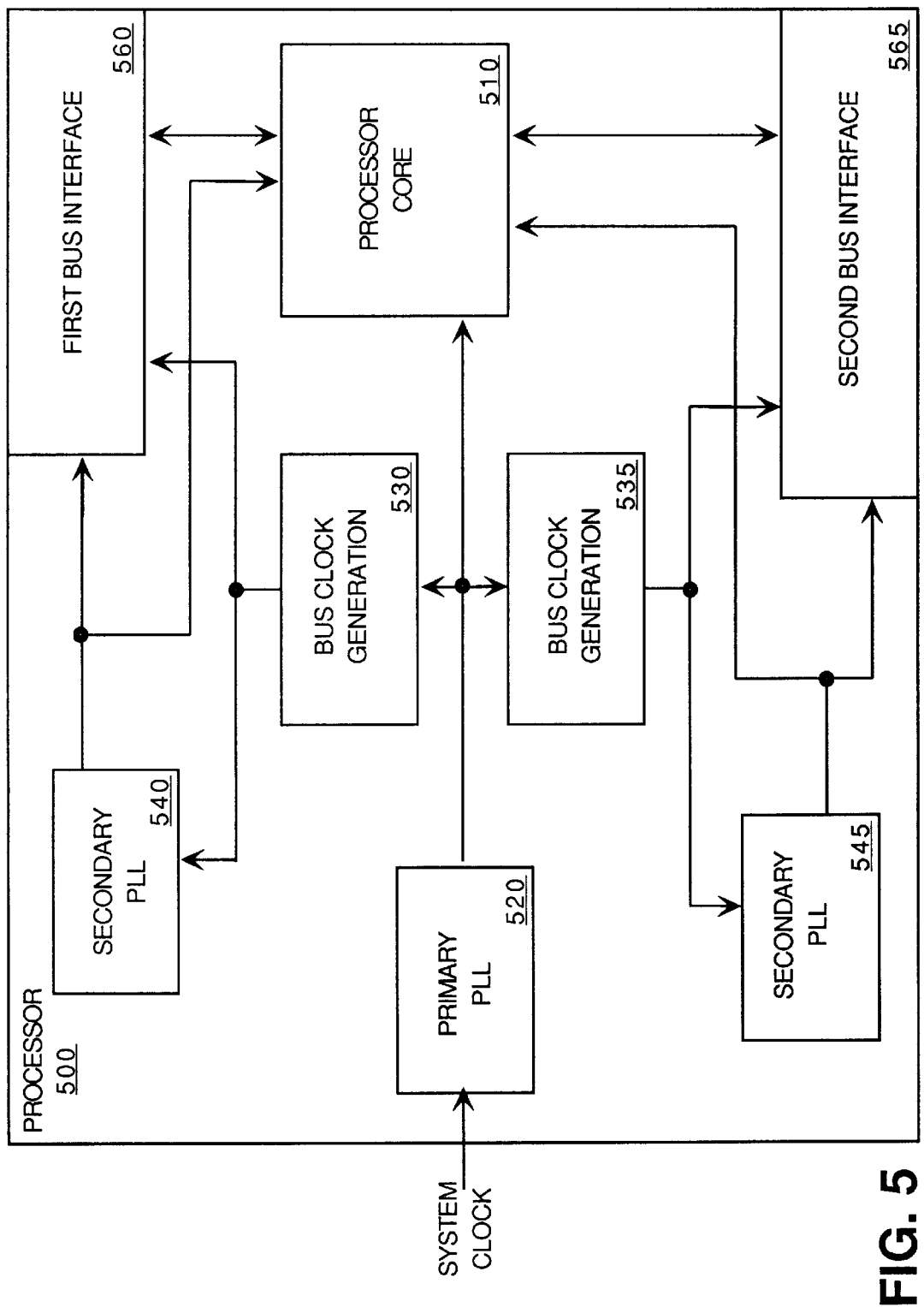
FIG. 5 is a block diagram of a processor having a multiple sequential synthesizer based clock generation scheme according to one embodiment of the invention.

FIG. 5 is a block diagram of a processor having a multiple sequential synthesizer based clock generation scheme according to one embodiment of the invention. The embodiment of FIG. 5 is a processor having two bus interfaces; however, the invention is also applicable to other devices communicating via a bus or directly.

Primary PLL 520 receives a system clock signal from a source external to processor 500. Primary PLL 520 generates a core clock signal that is distributed to processor core 510, bus clock generation logic 530 and bus clock generation logic 535. In one embodiment primary PLL 520 multiplies the system clock signal to generate the core clock signal. The core clock signal drives processor core 510.

Bus clock generation logic 530 generates a bus clock signal that is distributed to secondary PLL 540 and to first bus interface 560. Similarly, bus clock generation logic 535 generates a bus clock signal that is distributed to secondary PLL 545 and to second bus interface 565.

Secondary PLL 540 generates a secondary clock signal that is distributed to first bus interface 560 and to processor core 510. In one embodiment, first bus interface 560 includes strobe generation logic that generates a strobe signal in response to the secondary clock signal generated by secondary PLL 540. Processor core 510 outputs data, when appropriate, to first bus interface 560 in response to the secondary clock signal. In one embodiment, the strobe signal changes states on the falling edges of the secondary clock signal and data is output on the rising edges of the secondary clock signal.

Similarly, secondary PLL 545 generates a secondary clock signal that is distributed to second bus interface 565 and to processor core 510. In one embodiment, second bus interface 565 includes strobe generation logic that generates a strobe signal in response to the secondary clock signal generated by secondary PLL 545. Processor core 510 outputs data, when appropriate, to second bus interface 565 in response to the secondary clock signal. In one embodiment, the strobe signal changes states on the falling edges of the secondary clock signal and data is output on the rising edges of the secondary clock signal.

Figure 6:
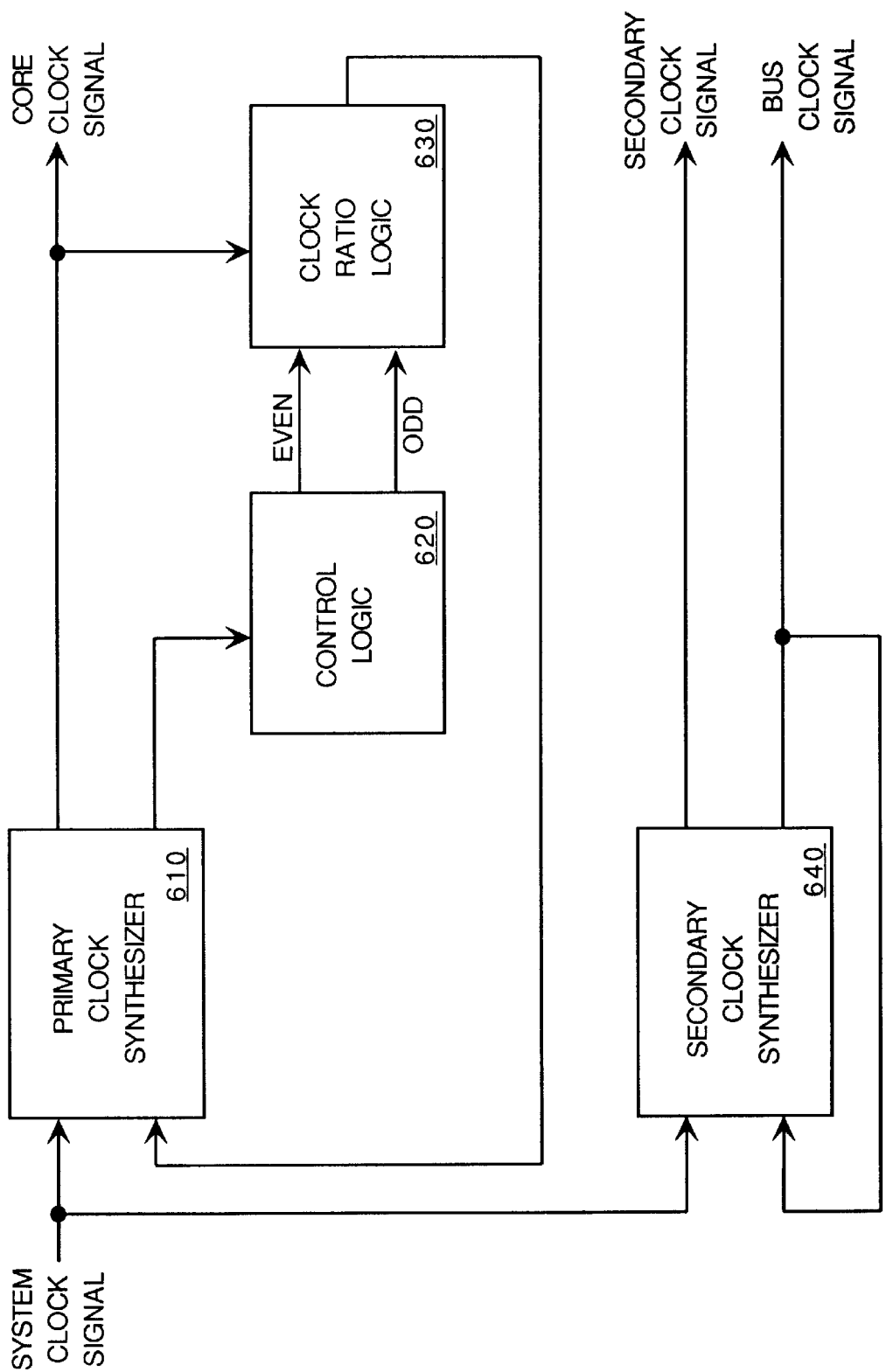
FIG. 6 is a block diagram of a multiple parallel synthesizer based clock generation scheme according to one embodiment of the invention.

FIG. 6 is a block diagram of a multiple parallel synthesizer based clock generation scheme according to one embodiment of the invention. Primary clock synthesizer 610 receives a system clock signal from an external source (not shown in FIG. 6). In one embodiment, primary clock synthesizer 610 multiples the system clock signal to generate a core clock signal. Primary clock synthesizer 610 can also divide the system clock to generate a core clock signal with a reduced frequency.

In one embodiment, primary clock synthesizer 610 also generates an enable signal that is provided to control logic 620. The enable signal is used to align the core clock signal with the system clock signal in an appropriate manner. Control logic 620 asserts either an even or an odd signal based, at least in part, on the enable signal generated by primary clock synthesizer 610.

In one embodiment, the even and odd signals indicate whether the core clock signal in an even or an odd multiple, respectively, of the system clock signal. Core ratio logic 630 receives the even and odd signals and controls the ratio of the core clock signal to the system clock signal by providing feedback to primary clock synthesizer 610.

Secondary clock synthesizer 640 also receives the system clock signal. Secondary clock synthesizer 640 multiplies the system clock signal to generate a secondary clock signal. In one embodiment, the frequency of the secondary clock signal is less then the frequency of the core clock signal; however, any frequency relationship can be provided. Secondary clock synthesizer 640 also generates a bus clock signal to drive a bus (not shown in FIG. 6).

In one embodiment, the secondary clock signal is input to strobe generation logic and data output circuitry (not shown in FIG. 6), as described above with respect to FIG. 3. The strobe generation logic outputs a strobe signal for use in source synchronous communications and the data output circuitry output data as appropriate.

By distributing clock generation devices (e.g., primary clock synthesizer, secondary clock synthesizer, bus clock generation logic), the multiple synthesizer clocking scheme of the invention provides clock distribution with reduced skew as compared to single synthesizer schemes. Three or more clock synthesizers can also be used to generate and distribute clock signals.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A circuit comprising:
    a primary clock synthesizer coupled to receive a system clock signal, the primary clock synthesizer to generate a core clock signal;
    bus clock generation logic coupled to the primary clock synthesizer, the bus clock generation logic to generate a bus clock signal based, at least in part, on the core clock signal;
    a secondary clock synthesizer coupled to the bus clock generation logic, the secondary clock synthesizer to generate a secondary clock signal based, at least in part, on the bus clock signal; and
    strobe signal generation logic coupled to the secondary clock synthesizer, the strobe signal generation logic to generate a strobe signal having transitions corresponding to alternate transitions of the secondary clock signal.

2. The circuit of claim 1 wherein the primary clock synthesizer comprises a phase locked loop (PLL) device.

3. The circuit of claim 1 wherein the primary clock synthesizer comprises a delay locked loop (DLL) device.

4. The circuit of claim 1 wherein the secondary clock synthesizer comprises a phase locked loop (PLL) device.

5. The circuit of claim 1 wherein the secondary clock synthesizer comprises a delay locked loop (DLL) device.

6. The circuit of claim 1 further comprising a clock ratio logic coupled to receive the core clock signal, the clock ratio logic to control the ratio of the core clock to the system clock.

7. The circuit of claim 1 wherein the bus clock signal frequency is substantially equal to the system clock signal frequency.

8. The circuit of claim 1 wherein the secondary clock signal frequency is an even multiple of the bus clock signal frequency.

9. The circuit of claim 1 further comprising data output logic to output data on alternating transitions of the secondary clock signal, wherein the transitions of the strobe signal occur approximately midway between the alternating transitions of the secondary clock signal on which the data is output.

10. An apparatus for generating clock signals, the apparatus comprising:

means for generating a core clock signal based, at least in part, on a system clock signal;

means for generating a bus clock signal based, at least in part, on the core clock signal;

means for generating a secondary clock signal based, at least in part, on the bus clock signal; and means for generating a strobe signal based, at least in part, on the secondary clock signal, the strobe signal having transitions corresponding to alternate transitions of the secondary clock signal.

11. The apparatus of claim 10 further comprising means for controlling a ratio between the core clock signal and the system clock signal.

12. The apparatus of claim 10 wherein the strobe signal has transitions corresponding to alternating transitions of the secondary clock signal.

13. The apparatus of claim 10 further comprising means for outputting data on alternating transitions of the secondary clock signal, wherein transitions of the strobe signal occur approximately midway between transitions of the secondary clock signal on which data is output.

14. A method of generating clock signals, the method comprising:

generating a core clock signal based, at least in part, on a system clock signal;

generating a bus clock signal based, at least in part, on the core clock signal;

generating a secondary clock signal based, at least in part, on the bus clock signal; and generating a strobe signal based, at least in part, on the secondary clock signal, the strobe signal having transitions corresponding to alternate transitions of the secondary clock signal.

15. The method of claim 14 wherein the strobe signal has transitions corresponding to alternating transitions of the secondary clock signal.

16. The method of claim 14 further comprising outputting data on alternating transitions of the secondary clock signal, wherein transitions of the strobe signal occur approximately midway between transitions of the secondary clock signal on which data is output.

17. The method of claim 14 wherein generating the core clock signal comprises providing the system clock signal to a phase locked loop (PLL) to generate the core clock signal.

18. The method of claim 14 wherein generating the core clock signal comprises providing the system clock signal to a delay locked loop (DLL) to generate the core clock signal.

19. The method of claim 14 wherein generating the secondary clock signal comprises providing the bus clock signal to a phase locked loop (PLL) to generate the secondary clock signal.

20. The method of claim 14 wherein generating the secondary clock signal comprises providing the bus clock signal to a delay locked loop (DLL) to generate the secondary clock signal.

21. A circuit comprising:

a primary clock synthesizer coupled to receive a system clock signal, the primary clock synthesizer to generate a core clock signal;

a secondary clock synthesizer coupled to receive the system clock signal, the secondary clock synthesizer to generate a secondary clock signal based, at least in part, on the bus clock signal; and strobe signal generation logic coupled to the secondary clock synthesizer, the strobe signal generation logic to generate a strobe signal having transitions corresponding to alternate transitions of the secondary clock signal.

22. The circuit of claim 21 wherein the primary clock synthesizer comprises a phase locked loop (PLL) device.

23. The circuit of claim 21 wherein the primary clock synthesizer comprises a delay locked loop (DLL) device.

24. The circuit of claim 21 wherein the secondary clock synthesizer comprises a phase locked loop (PLL) device.

25. The circuit of claim 21 wherein the secondary clock synthesizer comprises a delay locked loop (DLL) device.

\* \* \* \* \*